United States Patent

Cooney

[15] 3,651,401
[45] Mar. 21, 1972

[54] ARTICLE LOCATING AND POSITIONING APPARATUS

[72] Inventor: James S. Cooney, Attleboro, Mass.

[73] Assignee: Pylon Company, Inc., Attleboro, Mass.

[22] Filed: Apr. 9, 1970

[21] Appl. No.: 27,082

[52] U.S. Cl. .................324/158, 356/172, 324/62, 324/65, 346/33, 269/57
[51] Int. Cl. .................G01r 31/02, B23g 3/18
[58] Field of Search .................324/62, 65, 158; 346/33; 269/21; 350/900

[56] References Cited

UNITED STATES PATENTS

| | | | |
|---|---|---|---|
| 3,437,929 | 4/1969 | Glenn | 324/158 |
| 3,333,274 | 4/1965 | Forcier | 346/33 |
| 3,185,927 | 5/1965 | Marqulis | 324/158 |
| 3,345,567 | 10/1967 | Turner | 324/158 |

Primary Examiner—Herman Karl Saalbach
Assistant Examiner—C. Baraff
Attorney—Kenway, Jenney & Hildreth

[57] ABSTRACT

The invention is an apparatus for locating and positioning a wafer containing thereon a miniature printed circuit or integrated circuit on a test apparatus including two tables, one movable on the other. The wafer is first positioned on the one table, the second table is moved to a second position at which the one table is moved to further position the wafer, and then both tables are moved to a test position.

13 Claims, 14 Drawing Figures

INVENTOR
JAMES S. COONEY

BY
Kenway, Jenney + Hildreth
ATTORNEYS

INVENTOR
JAMES S. COONEY
BY
Kenway, Jenney + Hildreth
ATTORNEYS

INVENTOR
JAMES S. COONEY

INVENTOR
JAMES S. COONEY

BY
Kenway, Jenney + Hildreth
ATTORNEYS 3,651,401

ARTICLE LOCATING AND POSITIONING APPARATUS

BACKGROUND OF THE INVENTION

In the manufacture and use of miniature electronic circuit boards, a problem arises in the testing of the components prior to the use of the complete circuit board in a piece of electronic apparatus. The problem is that many test points must be connected to individual test probes, and this requires a high degree of accuracy in locating the wafer in such position so that all of the test probes will make contact with the proper connection points on the miniature circuit board. When it is realized that one of these boards may be, for example, no more than approximately 1 inch long by a half inch wide, and that there may be several hundred test points to which test probes must be connected simultaneously, then it is seen that the degree of accuracy of location of the board with respect to the testing device itself must be high, and the wafer must lie in its test location within the tolerance of not much more than about ±0.001 inches, or smaller.

Also, in the manufacture and testing of such wafers, time becomes an important economic factor, and therefore a problem occurs in quickly as well as accurately locating the wafer with respect to a set of predetermined coordinates (such as the coordinates of the various test probes). A further problem arises in that the test apparatus must be convenient to use in the sense that the wafers can be mounted on the apparatus at a loading station conveniently, quickly, and accurately, and after testing, the wafer can be easily removed, unloaded and a new wafer inserted.

It is sometimes customary in the manufacture of such wafers to provide two indexing points on them at the time that the miniature circuit is created thereon, these reference points bearing a constant fixed relationship to the components of the circuit itself and the test connection points. These reference points are then utilized in one way or another to pre-locate the wafer with respect to the probe points of the test apparatus. However, in the past the difficulty of locating these points with the degree of accuracy required has been both difficult and time consuming.

SUMMARY OF THE INVENTION

Therefore, it is the general purpose of this invention to provide a locating and positioning apparatus specifically for the above wafers, but also for any article which needs to be located accurately in relationship to a predetermined set of coordinates, using reference points previously placed upon the article.

Another object of the invention is to provide apparatus of the above general class, in which means are provided for first locating on a table accurately one of the reference points with respect to predetermined coordinates, and thereafter under the control of micrometer adjustments, and using accurate sensing means, locating the other reference point with reference to the coordinates.

Yet another object of the invention is the provision of an apparatus of the last-named class, which is adaptable for prelocating miniature electronic circuit boards accurately with respect to test probes, the accuracy being within the range of 0.001 inch.

The invention accordingly comprises the elements and combinations of elements, features of construction, arrangement of parts, and steps and sequence of steps and features of operation of the apparatus together with manipulation thereof, all of which will be exemplified in the structures of the apparatus and in the methods herein described, and the scope of the application of which will be indicated in the appended claims.

In the accompanying drawings, in which several of the various possible embodiments of the invention are illustrated:

Figure 1:
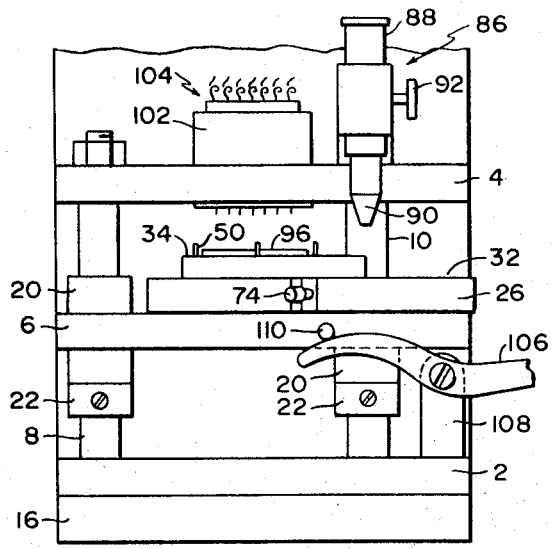
FIG. 1 is a front elevation of a first embodiment of the invention showing the parts thereof in one position.
Figure 2:
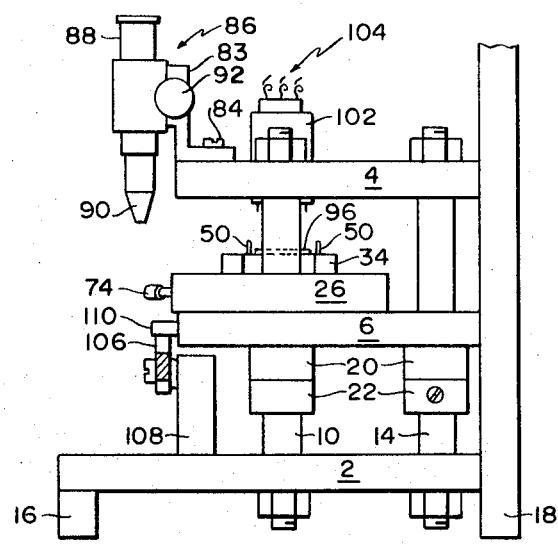
FIG. 2 is an end elevation of the embodiment of FIG. 1.

Similar reference characters indicate corresponding parts throughout several views of the drawings; and in the drawings the dimensions of certain of the parts as shown may have been modified, enlarged or otherwise changed in relation to other parts for the purpose of clarity of illustration and understanding of the invention.

Referring now to the drawings for a description of the invention, a front elevation of one embodiment is shown in FIG. 1 and illustrates a typical die set comprising a sub-base 2, a top 4 and an intermediate movable base 6, guide pins 8, 10, 12 and 14 being provided in customary fashion to hold the top plate 4 and sub-base 2 in predetermined spaced apart position, utilizing suitable shoulders and nuts as clearly shown. The sub-base 2 rests upon the conventional legs 16 and 18, these being provided in order to provide clearance for the bottom nuts of the guide pins.

Base 6 is provided with collars or sleeves 20 suitably attached thereto, the function of the sleeves being to provide bearings on the pins 8–14 so that the base 6 will slide smoothly thereon. In order to provide a rest for the lowermost position of the base 6, collars 22 may be fixed to the pins using suitable set screws, all in conventional manner.

As thus described, the die set comprising the several elements described is conventional and no further detail will be given herein as to the basic parts.

Figure 4:
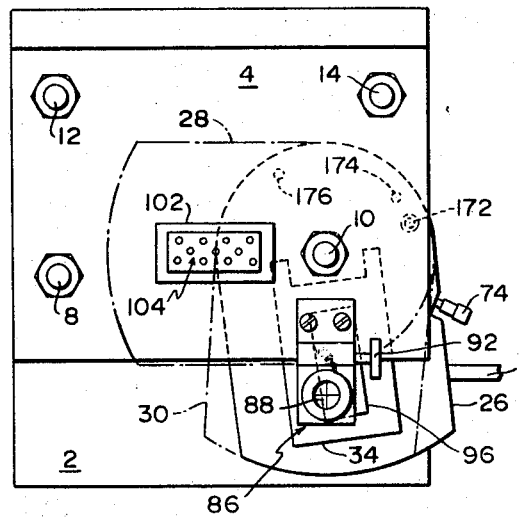
FIG. 4 is a plan view of the first embodiment of the invention, looking down on the operating positions thereof as shown in FIG. 3.
Figure 3:
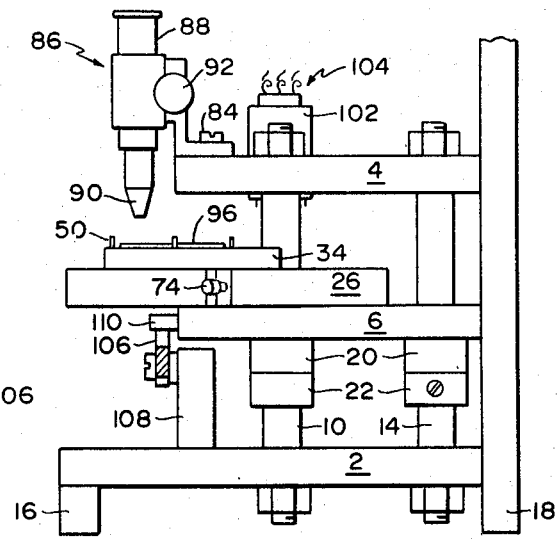
FIG. 3 is an end elevation similar to FIG. 2, but showing certain working parts in a second or loading position.

Mounted on the slidable plate or base 6 is a first means 26 comprising a steel first plate or platform 26 of suitable thickness to give rigidity, this platform being pivoted to swing about pin 10 by means of a bearing hole 27 (see FIG. 5) which makes an accurate sliding or pivoting fit around the guide pin 10. The reason for the closeness of the fit is that for the apparatus to have the required degree of accuracy, there must be no play of the plate 26 in its bearing on the guide pin 10. As shown in FIG. 4, the plate 26 slides on the surface of plate 6 as it rotates around the guide pin 10, FIG. 4 showing the plate in its furthermost or outermost position (hereinafter called the first position) and being completely rotatable so as to underlie the top plate 4 as indicated by the dotted lines 28 in FIG. 4. The position shown by numeral 28 will hereinafter be called the third or testing position. An intermediate position herein called the second position is indicated by dotted lines 30. The plate 26 is indexed by a conventional detent mechanism described below in respect to FIG. 14 (not shown) so that it will removably lock in each of the three positions shown in FIG. 4. The first and second positions are the positions occupied by plate 26 when the wafer is accurately being located on the plate as will be described below, and the third position is that occupied by plate 26 when the wafer is positioned for testing.

The plate 26 is of steel or other strong and rigid material. The plate has a smooth top surface 32, and on this top surface there rests a second means comprising a second rigid steel plate 34 having a top surface 36.

Figure 5:
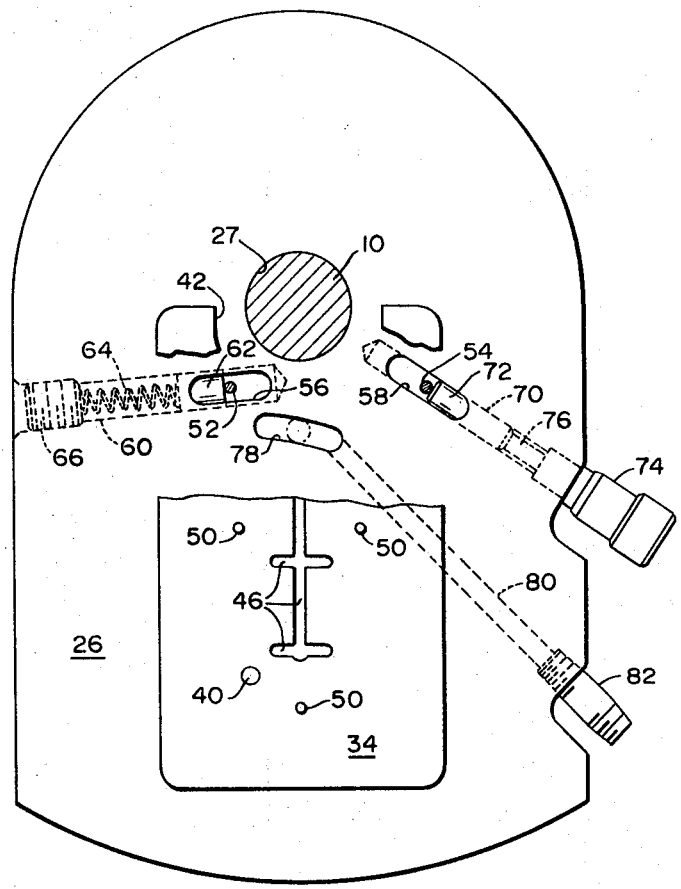
FIG. 5 is an enlarged view of an assembly of certain operating elements of the embodiment, one of the elements being shown only partially for better understanding of the drawing.
Figure 6:
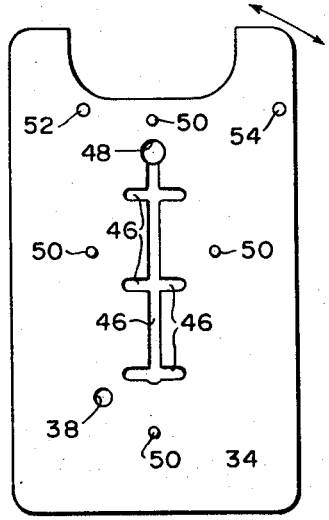
FIGS. 6 and 7 are plan and side views of an element of the invention.
Figure 7:
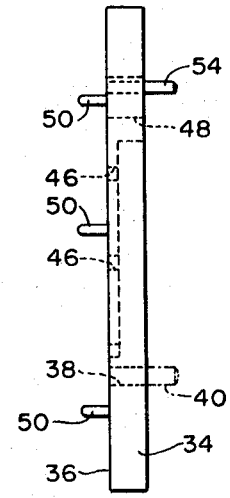

Referring now to FIGS. 5, 6 and 7, plate 34 is preferably smaller than plate 26, is also thick enough to provide rigidity, and is provided with a pivot hole 38 which is adapted to receive rotatably and yet with a minimum of play, a pivot 40 which is mounted in the plate 26. (Lack of play in this bearing is necessary for the reasons given above as to pin 10 and bearing hole 27.) One end of the plate 34 is preferably provided with a shallow yoke 42, this yoke loosely surrounding the guide pin 10 (see FIG. 5) so that when the plate 34 is pivoted on the top of plate 26 by means of the pivot 40, the plate has a certain amount of freedom to rotate.

A plurality of shallow grooves 46 is milled in the top surface 36, and one end of these grooves terminates in the hole 48 which traverses the entire thickness of the plate 34. The length and position of grooves 46 and hole 48 are such as to underlie the wafer to be tested. Extending upwardly from the plate 34 are a plurality of guide pins 50, the function of which is to loosely confine (for initial adjustments) a wafer of the kind to be tested by this apparatus. Projecting downwardly from the plate 34 or to the right as viewed in FIG. 7 are a pair of pins 52 and 54.

Referring more specifically to FIG. 5, a relatively enlarged view of plate 26 is shown, with the plate 34 mounted thereon, a portion of the plate 34 being broken away to show other details. The grooves 46 described above are shown and three of the pins 50. Shown in section are the guide pins 52 and 54, and it will be observed that these pins project downwardly into slots or elongated sockets 56 and 58 provided in plate 26. The sockets are wider than the diameter of pins 52 and 54 and are angled suitably to permit swiveling of the plate 34 about the pivot 40 when, for example, the pin 54 is moved along socket 58.

A bore 60 extends inwardly from the edge of plate 26 and intersects slot 56. Mounted therein is a plunger 62 adapted to bear against the pin 52, and a compression spring 64 backing up the plunger. A thread plug 66 is threaded into the end of bore 60 to contain the spring. By this means there is provided a resilient force biasing the pin 52 to the right as viewed in FIG. 5.

Similarly, on the other side of the plate 26, a bore 70 extends inwardly from the edge of plate 26 and intersects slot 58. Plunger 72 is fitted into this bore and is adapted to bear against the pin 54. Threaded into the outer end of the bore 70 is a micrometer head 74, the spindle 76 of which bears against the other end of the plunger 72. The socket 58 is suitably angled so that by moving the pin 54 by means of the micrometer the pin will be caused to slide along the socket thus swiveling the plate 34 about the pivot 40 and against the bias of spring 64.

A recess 78 is provided extending part way through the thickness of the plate 26, and is positioned so that the hole 48 in the plate 34 will overlie the recess regardless of the position occupied by the plate 34 when it is swiveled about pivot 40. A bore 80 is provided in the plate 26 which communicates with the recess 78 at one end, and with the outer edge of the plate as shown. Attached to the outer end of the bore is a suitable nipple 82 to which a flexible suction tube may be attached.

It will be noted that for clarity of the drawings, the nipple 82 is not shown in FIGS. 1, 3, 4 and 8–13. It will be understood that in all forms or embodiments shown, it is intended that the suction holding means is preferably to be used; and, therefore, as to said drawing figures, it is to be understood that the nipple and suction connections are included by reference.

The function and operation of the groove 46, the pins 52 and 54 plus the micrometer head 74 and compression spring 60, as well as the recess 78 and suction hose is as follows:

By means of adjusting the micrometer head 74, the pin 54 is driven along its socket 58 to swivel the plate 34 within the range permitted by the width of the yoke 42 at the end of the plate. The swiveling takes place at all times around the pivot 40. Whatever the adjustment of the micrometer 74, the plate 34 will be locked in a set position because of the resilient bias of the compression spring 64 acting against the plunger 62 and pin 52 in opposition to the plunger 72 and pin 54.

When a wafer is placed on the plate 34 to overlie grooves 46 and hole 48, and then air is evacuated through hole 48, recess 78 and bore 80, a negative pressure will then exist and in the enclosure formed by the grooves 46 and the underside of the wafer which is placed over these grooves. This results in a positive pressure on the top surface of the wafer so that the latter will be held to the top surface of the plate 34. However, because the attachment to the nipple 82 is made with a flexible hose, it will be possible to move plate 26 (and thus plate 34) into any one of the first, second and third positions, without exercising any undue force on the respective plates and without exercising any force laterally in respect to the wafer which will tend to get it out of adjusted position during such motions.

Attached to the top plate 4 is a bracket 83, attachment being by the conventional machine screws 84. Attached to the upright portion of the bracket is the microscope head indicated generally by numeral 86, the microscope comprising the barrel 88 with eye piece, the objective lens 90 and the adjusting screw 92. The microscope is conventional in nature, and no further description will be given herein, except to state that it is provided with a reticule having a cross-hair or other indicating or locating indicium thereon. Microscope 86 is so positioned that when the plate 26 is in its first position, the cross-hair of the microscope will exactly overlie the axial center of the pivot pin 40. This is critical.

Figure 8:
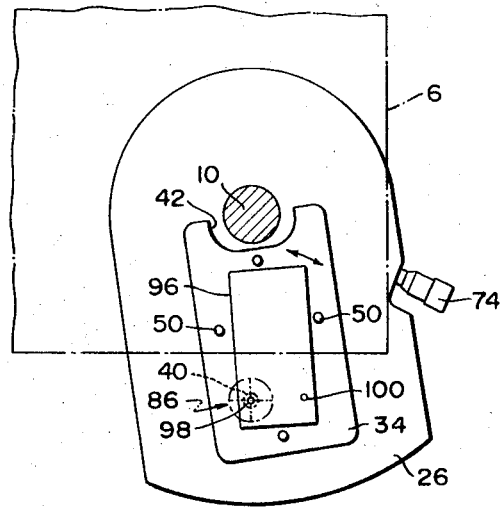
FIGS. 8, 9 and 10 are schematic views showing three positions in which the operating parts of the preferred embodiment are placed to locate and test the wafer.
Figure 9:
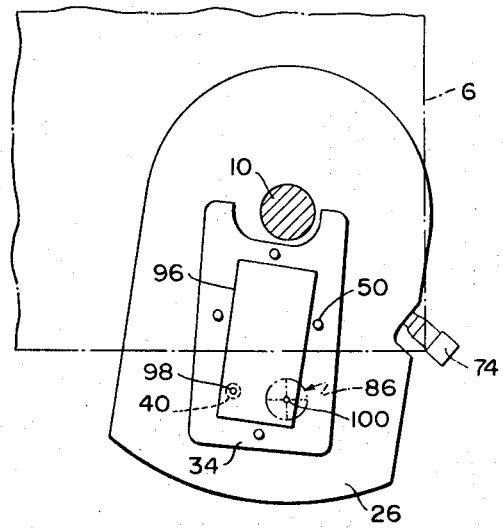
Figure 10:
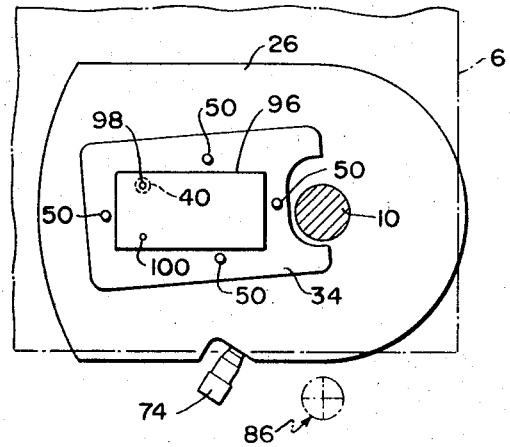

Referring now to FIGS. 8, 9 and 10 for a description of the method of locating a wafer in the apparatus, the plate 26 is moved to the first position as shown in FIG. 8. The plate 34 is swiveled about the pin 40 until the guide pin 10 approximately bisects yoke 42. A wafer 96 is placed between the pins 50, and manually the first locating indicium 98 on the wafer is lined up to be beneath the cross-hairs of the microscope. It follows, therefore, that in this aligned position, the first locating indicium will be exactly over the axial center of the pin 40.

With the wafer in this position on the plate 34, and without movement of the plate 34, the plate 26 is swung clockwise as viewed in FIG. 8 to the second position as shown in FIG. 9. It will probably be found that in the second position, the second locating indicium on the wafer 96, that is, locating indicium 100 will not be beneath the cross-hairs of the microscope. However, this second locating indicium can now be brought under the cross-hairs by an adjustment of the plate 34 about the pivot 40 on the plate 26, using the micrometer 74. This adjustment is carried out until indicium 100 also lies under the microscope cross-hairs.

At this point, suction is applied to the nipple 82 with the result that the wafer 96 will be held securely on the plate 34, and as an incidental feature, the plate 34 will also be held to the plate 26. Then, while maintaining the suction to hold the parts in their relatively adjusted positions, the plate 26 (with its carried plate 34 and wafer 96) is moved to the third position as shown in FIG. 10, where the wafer will be directly underneath the test probe block 102, the latter constituting the fixed reference points as to which the wafer to be tested must be accurately aligned or established within the limits set forth above. Test probe block 102 is indicated schematically as having arranged therein a plurality of test probes 104, the latter being in a predetermined arrangement such that the lower ends of the probes will contact the proper test points on the wafer, when the latter is moved upwardly.

At this point, and while still maintaining the suction, the plate 6 is moved upwardly until the inner ends of the probes indicated generally by number 104 come to rest at the preselected test points on the wafer. This motion of the plate up and down may be performed conventionally by the use of an air cylinder if desired; or, a conventional lever 106 may be used, which may be pivoted as shown on a support 108 on the base 2, the other end of the lever engaging a pin 110 which projects outwardly from the edge of the plate 6. In view of the fact that the means for moving the plate 6 up and down are conventional and basically not part of this invention, the means shown are only schematic and it is within the skill of the art to use other means, if desired.

Figure 11:
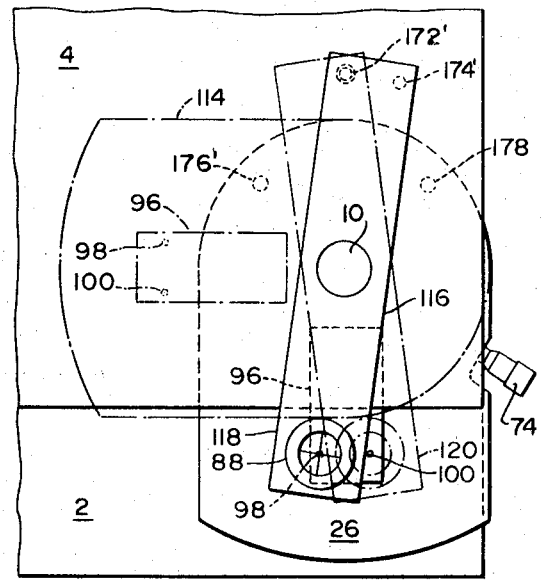
FIG. 11 is a plan view similar to FIG. 4, showing a second embodiment of the invention.
Figure 12:
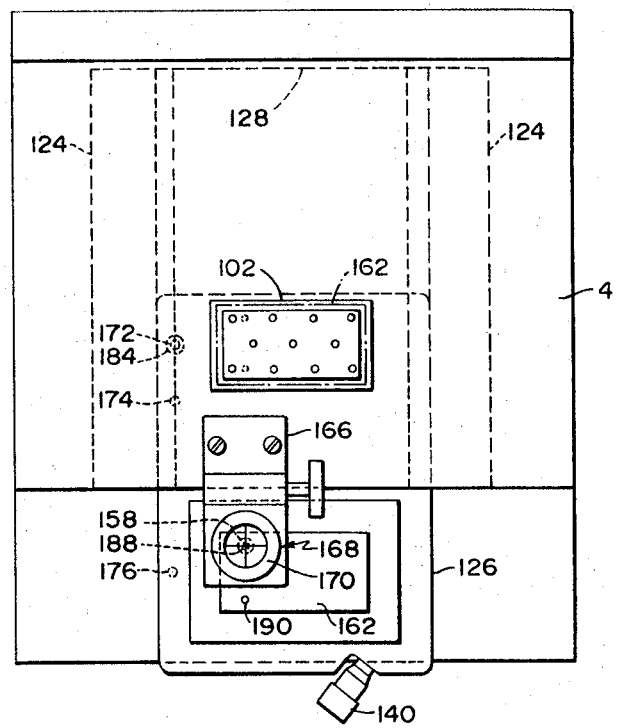
FIG. 12 is a plan view similar to FIG. 4, showing a third embodiment of the invention.
Figure 13:
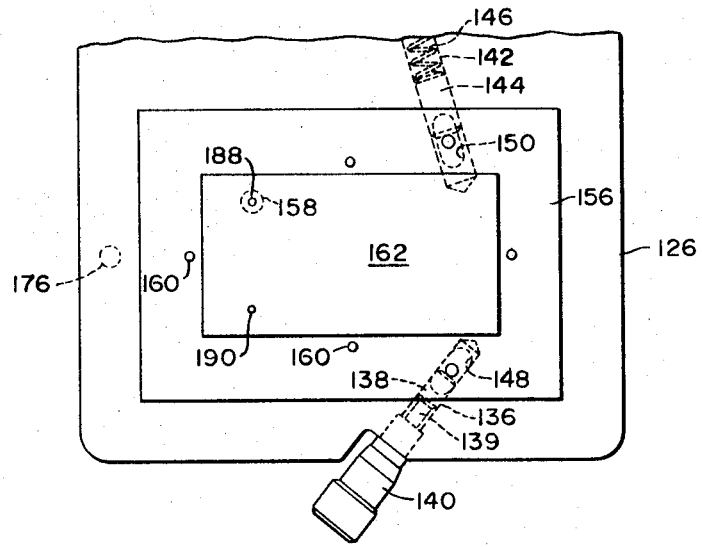
FIG. 13 is an enlarged portion of the FIG. 12 embodiment given to show in greater detail certain features of construction.

Referring now to FIG. 11, there is shown a plan view of another embodiment of the invention, using basically the same elements of the apparatus as are shown in the FIGS. 1-10. However, the essential difference between the FIG. 11 embodiment and that of FIGS. 1-10 is that the table 26 in this embodiment moves into only two positions, one being a first position shown in full lines in FIG. 11, and the other being the third or test position of the first embodiment, shown by dotted lines 114. (Position 114 is the same position as that indicated by dotted lines 28 in FIG. 4.)

In view of the fact that the table 26 will be moved only to a single locked loading or first position for adjustment of the ceramic wafer thereon, means must be provided for indexing beneath the microscope both of the indicia 98 and 100 on the wafer. To this end, it is the microscope support 116 which is suitably pivoted about the pin 10 about which the table 26 rotates. The microscope 116 is detachably locked in the first position shown in the full lines 118 but may be pivoted counterclockwise (as viewed in FIG. 11), to the dotted line position 120. This, of course, corresponds to the basic feature of the embodiment of FIGS. 1-10, where the microscope is stationary but the table 26 is detachably locked in either of the two positions.

In all other respects, this embodiment is the same as the previous one. The operation of this embodiment is to swing the table 26 to its locked out first position shown in the full lines, and the microscope is moved into its detachably locked position 118. In this position, the cross-hairs on the microscope will be lined up with the axial center of the pivot 40, as in the first embodiment. The ceramic wafer is then placed with its first indicium 98 beneath the cross-hairs of the microscope, thus locating this indicium. Then, the microscope support is moved to the position indicated by dotted lines 120, and the table 34 is moved by means of micrometer 74 until the second indicium 100 comes under the microscope cross-hairs. Once these adjustments have been made, suction is applied to the nipple 82 to hold the wafer onto table 34. Table 26 is swung to the test position indicated by dotted line 114, and thereafter the base 6 is raised until the wafer makes engagement with the contact probes 104.

In the above embodiments, for reasons of accuracy and simplicity of manufacture, the table 26 is shown pivoted about the pin 10. However, it may be found more convenient to use a linear motion for the table 26 rather than the swinging movement shown in the previous two embodiments. Therefore, referring to FIG. 12, there is shown a third embodiment of the invention in which the movable table 126 (corresponding to table 26) is shown slidably mounted on base 6 by means of dovetail slides 124, which must be very accurately made. Table 126 is shown in full lines pulled out from beneath the test block 102 to its loading position. By dotted line 128 is indicated the position of the rear end of the table when in its test position.

Table 126 is, like table 26, provided with a bore 136 extending inwardly from its front edge, and into the bore, as in the previous embodiments, is slidably mounted plunger 138. The spindle 139 of a micrometer 140 extends into the bore 136, to engage plunger 138. Similarly, extending inwardly from the opposite side of table 126 is provided a bore 142 within which is slidably mounted a plunger 144 biased by the spring 146, as in the preceding embodiments. Slots 148 and 150 are provided in the top surface of the plate 126 to meet the bores 136 and 142 set forth in FIG. 5 which will receive a pair of pins 152 and 154 respectively which extend downwardly thereinto from a plate 156 which corresponds to the plate 34 of the FIG. 1 embodiment. A pivot pin 158 is mounted in the plate 126, about which is accurately rotatable the plate 156.

Guide pins 160 similar to guide pins 50 of FIG. 5, are mounted on the plate 156, which loosely position the wafer 162 which is to be adjusted on the plate 126.

Attached to the top plate 4 of the die set is a bracket 166 which supports the microscope head indicated generally by numeral 168. The microscope barrel and optical system 170 will have, as in the previous embodiments, a reticule therein containing a cross-hair which is accurately aligned with the axis of pin 158.

Figure 14:
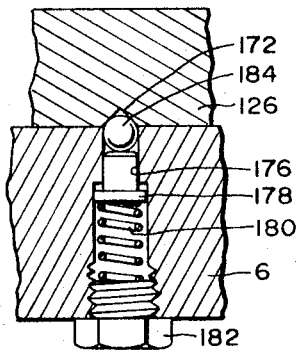
FIG. 14 is an enlarged view of detent detail used on all embodiments.

The table 126 is indexed into three positions. The indexing may be done in conventional manner, as shown in FIG. 14, using a spring biased detent ball engaging suitable cavities in the lower surface of the plate 126 and the top surface of the base 6. Three conical recesses 172, 174 and 176 are provided in the under side of plate 126, corresponding respectively to the first (or loading) position of the plate, the second position, and the third (or test) position. A bore 176 is provided in base 6, within which is mounted a plunger 178, and a biasing spring 180, the assembly being held together by means of the screw plug. A ball bearing 184 is located at the top of the bore 176 and is biased upwardly by plunger 178 to engage the three detent cavities 172, 174 and 176.

In operation, the table 126 is pulled to its outermost position, in which the detent ball 184 engages its respective recess 172 in the plate 126 to hold the plate detachably in this position. A wafer 162 is placed on the plate 156, and manually adjusted until its locating indicium 188 is centered under the cross-hairs of the microscope 170, that is, accurately centered over the pin 158. The table 126 is now moved inwardly until the ball 184 engages its next succeeding proper recess 174 to hold the plate in its second position. At this point the micrometer 140 is turned in the proper direction to rotate the plate 156 about the pivot point 158, until the indicium 190 comes under the cross-hairs of the microscope. This having been done, suction is applied as in the previous embodiments, to hold the wafer to plate 156, and the thus adjusted assembly is then slid to the point that the ball 184 engages recess 172 in the plate 126, to hold the plate in its innermost or third position. At this point, the wafer will be located correctly under the test probe 102-104 for testing when plate 6 is raised.

It is to be noted that the distance moved by either of plates or platforms 26 and 126 measured along a path lying on a plane perpendicular to the axis of the pivots 40 and 158 in the respective embodiments, is equal to the distance between the locating indicia 98, 100 and 188, 190 on the wafers respectively of the embodiments, the sensing means being the line of sight of the microscope through the cross-hairs therein or equivalent sighting means. It is possible, but not preferred, to use mechanical or electrical, rather than optical, means for sensing the axial center of the respective pivots. In such event, the remarks above in regard to the length along said path also apply.

The ball-type detent arrangement has been described above particularly with reference to the third embodiment. However, it is apparent that the same kind of detent arrangement is usable with respect to the first and second embodiments. The position of the detent recesses in plate 26 is indicated in dotted lines on FIG. 4. In FIG. 11, the recess for positions of the microscope bracket are indicated by dotted circles 172' and 174', with the plate 4 being provided with the suitable spring-biased ball. The position of plate 26 shown in dotted lines 114 may be indexed by the recess 176' in the bottom of plate 126, and suitable ball detent in the plate or base 6; and indexing for plate 26 as fully extended (full lines in FIG. 11) will be by index recess 178.

In view of the above it will be seen that the several objects of the invention are achieved and other advantageous results attained.

It is to be understood that the invention is not limited in its application to the details of construction and arrangement of parts illustrated in the accompanying drawings, nor to the methods described, since the invention is capable of other embodiments and of being practiced or carried out in various ways. Also, it is to be understood that the phraseology or terminology employed herein is for the purpose of description and not of limitation.

As many changes could be made in the above constructions and methods without departing from the scope of the invention, it is intended that all matter contained in the above Having described the invention, what is claimed is:

1. Apparatus for locating an article on a surface with respect to predetermined reference coordinates, the article having first and second locating indicia thereon, comprising: a base; first means movably mounted on the base; second means carried by the first means and rotatable thereon about a pivot, the first movable means being movable to a first position, and the second means being adapted to hold said article with the first locating indicium in alignment with axis of the pivot; means for moving the second means with respect to the first means about said pivot; and sensing means mounted on the base; one of the first means and the sensing means being movable relative to the other in a predetermined direction into predetermined first and second spaced relationships, relative to said other, means for removably locking said one of the first means and sensing means into each of the positions defining said spaced relationships, the sensing means when in said first spaced relationship being positioned to sense the axial center of said pivot and the first locating indicium; and the second means being adapted to be moved with respect to the first means to bring the second locating indicium in position to be sensed by the sensing means when the sensing means and the first means are in said second spaced relationship.

2. The apparatus of claim 1 in which the first and second means each comprises a movable platform, the second means lying on the first means, and the first means being movable from a third position to said first position.

3. Apparatus for locating an article on a surface with respect to predetermined reference coordinates, the article having first and second locating indicia thereon, comprising: a base; first means movably mounted on the base; second means carried by the first means and rotatable thereon about a pivot, the first movable means being movable to a first position, and the second means being adapted to hold said article with the first locating indicium in alignment with axis of the pivot; means for moving the second means with respect to the first means about said pivot; and sensing means mounted on the base; the first means and the sensing means being movable relative to each other in a predetermined direction into a first and a second spaced relationship, the sensing means when in said first spaced relationship being positioned to sense the axial center of said pivot and the first locating indicium; and the second means being adapted to be moved with respect to the first means to bring the second locating indicium in position to be sensed by the sensing means when the sensing means and the first means are in said second spaced relationship; said sensing means comprising a microscope with a reticle therein having indexing means thereon which are adapted to be aligned with the axial center of said pivot when the first means is in the first position.

4. Apparatus for locating an article on a surface with respect to predetermined reference coordinates, the article having first and second locating indicia thereon, comprising: a base; first means comprising a platform movably mounted on the base; second means comprising a platform carried by and lying on the first means and rotatable thereon about a pivot, the first movable means being movable from a third position to a first position, and the second means being adapted to hold said article with the first locating indicium in alignment with axis of the pivot; means for moving the second means with respect to the first means about said pivot; and sensing means mounted on the base and comprising a microscope having a reticle; the first means and the sensing means being movable relative to each other in a predetermined direction into a first and a second spaced relationship, said reticle having indexing means thereon adapted to sense the axial center of said pivot and the first locating indicium when said first means is in the first position; and the second means being adapted to be moved with respect to the first means to bring the second locating indicium in position to be sensed by the sensing means when the sensing means and the first means are in said second spaced relationship.

5. The apparatus of claim 4 in which the first means comprises a platform pivoted to rotate on said base, and including releasable means for holding the article onto the second means.

6. The apparatus of claim 5 in which said microscope is in fixed position on the base, and the first platform indexes into a plurality of discrete positions, in the first of which the microscope reticle indexing means is aligned with the axial center of said pivot.

7. The apparatus of claim 1 in which the apparatus includes a test fixture, said first means being movable from a third position in which the article is positioned to be tested by test fixture to said first position in which the sensing means is adapted to be aligned with the axial center of said pivot.

8. Apparatus for locating an article on a surface with respect to predetermined reference coordinates, the article having first and second locating indicia thereon, comprising: a base; a test fixture on the base; a first platform movably mounted on the base into first, second and third positions and being adapted to be locked into each of said positions by suitable detents; a second platform carried by the first platform and rotatable thereon about a pivot, the second means being adapted to hold said article with the first locating indicium in alignment with axis of the pivot; means for moving the second platform with respect to the first platform about said pivot; and sensing means mounted on the base; the first means and the sensing means being movable relative to each other in a predetermined direction into a first and a second spaced relationship, the sensing means when the first platform is in said first position being adapted to be aligned with and to sense the axial center of said pivot and the first locating indicium; in the second position the second locating indicium is in position to be sensed by the sensing means; and in the third position the article is positioned to be tested by the test fixture.

9. The apparatus of claim 8 in which the first platform slides linearly with respect to the base, into said first, second and third positions.

10. Apparatus for locating an article on a surface with respect to predetermined reference coordinates, the article having first and second locating indicia thereon, comprising: a base; first means movably mounted on the base; second means carried by the first means and rotatable thereon about a pivot, the first movable means being movable to a first position, and the second means being adapted to hold said article with the first locating indicium in alignment with axis of the pivot; means for moving the second means with respect to the first means about said pivot; and sensing means mounted on the base; the first means and the sensing means being movable relative to each other in a predetermined direction into a first and a second spaced relationship, the sensing means when in said first spaced relationship being positioned to sense the axial center of said pivot and the first locating indicium; the second means being adapted to be moved with respect to the first means to bring the second locating indicium in position to be sensed by the sensing means when the sensing means and the first means are in said second spaced relationship; and including indexing means for removably locking the first means and the sensing means in each of the positions corresponding to the first and second spaced relationship, the indexing means controlling said positions so that the distance therebetween along a plane perpendicular to the axis of said pivot is equal to the distance between said locating indicia.

11. The apparatus of claim 1 in which both the first and second means are platforms, the second platform lying on the first platform, the first platform being adapted to carry said article and to be moved into at least first and third positions; in the first position the sensing means is in a first relationship with the first means in which it is aligned with the axial center of said pivot; and in the third position the first platform being in a position where said article may be tested; and said first means and said sensing means being movable relative to each other into a second spacial relationship in which the second locating indicium may be sensed by the second sensing means upon motion of the second platform about said pivot.

12. The method of locating an article in a desired position surface with respect to predetermined reference coordinates, comprising the steps of:
   providing a first and a second platform, the second platform being carried by the first platform and movable thereon about a pivot point;
   providing a sensing means adapted to sense the axial center of said pivot point;
   mounting an article having two locating indicia onto the second platform in alignment with the axial center of said pivot point;
   moving the sensing means and first platform relative to each other a predetermined distance without moving the article on the second platform;
   moving the second platform on the first platform about said pivot without disturbing the article on the second platform to bring the second indicium point in alignment with the sensing means; and
   moving the first platform, the second platform and the article to a third position in which the article occupies the desired position in respect to said predetermined reference coordinates.

13. The method of claim 12 in which said predetermined distance is measured along a plane perpendicular to the axis of said pivot, and is equal to the distance between said locating indicia.

* * * * *